United States Patent [19]

Caron et al.

[11] Patent Number: 4,878,731

[45] Date of Patent: Nov. 7, 1989

[54] FIBER OPTIC CONNECTOR INCLUDING FERRULE WITH FILTER ISOLATOR

[75] Inventors: Bernard G. Caron, Harrisburg; Pamela R. Gutterman, Camp Hill; Dale D. Murray, Mount Joy, all of Pa.

[73] Assignee: AMP Incorporated, Harrisburg, Pa.

[21] Appl. No.: 146,447

[22] Filed: Feb. 19, 1988

[51] Int. Cl.⁴ .................................... G02B 6/38
[52] U.S. Cl. .......................... 350/96.21; 350/96.16; 350/96.20
[58] Field of Search ............ 350/96.15, 96.16, 96.20, 350/96.21, 96.22; 370/1, 3

[56] References Cited

U.S. PATENT DOCUMENTS 4,708,425 11/1987 Gouali et al. ............... 350/96.16
4,712,859 12/1987 Albanese et al. ............ 350/96.16

FOREIGN PATENT DOCUMENTS 3509354 9/1986 Fed. Rep. of Germany ......... 370/3
0114251 9/1979 Japan ........................ 350/96.15
0041468 3/1980 Japan ........................ 350/96.15
0117739 7/1983 Japan ........................ 370/3
0200511 9/1986 Japan ........................ 350/96.16

OTHER PUBLICATIONS

Gould Fiber Optic Components-Single Mode Fused Wavelength Div. Multiplexes/Demultiplexes (Bulletin GD-12-Gould Electronics).
Designer's Guide to Fiber Optics-Part 3, EDN Magazine, Cahners Pub. Co., Boston, MA 02116, unnumbered pages.

Primary Examiner—William L. Sikes
Assistant Examiner—Xuan Thi Vo

[57] ABSTRACT

In accordance with the present invention, a wavelength selective passive filter is sealed onto the end of a ferrule to form a connector which may be used to increase the wavelength sensitivity of fiber optic components. In particular, such connectors may be used to increase the wavelength isolation of WDM devices.

2 Claims, 1 Drawing Sheet

FIBER OPTIC CONNECTOR INCLUDING FERRULE WITH FILTER ISOLATOR

FIELD OF THE INVENTION

The present invention relates to a fiber optic connector which is formed by sealing a wavelength selective filter onto the end face of a ferrule which terminates an optical fiber. The connector may be used to increase the wavelength sensitivity of fiber optic components.

BACKGROUND OF THE INVENTION

Wavelength division multiplexing and demultiplexing (WDM) techniques play an important role in presently used optical fiber telecommunications systems. WDM techniques allow two or more wavelengths of light to be transmitted simultaneously in the same optical fiber. This significantly increases the information carrying capacity of the optical fiber and also significantly reduces the complexity of networks implemented using optical fibers. For example, using WDM techniques, a two way communications link can be achieved using a single fiber.

Typically, WDM devices may be used to multiplex and demultiplex signals 1550 nm and 1300 nm in the case of a single mode fiber system. An example of such a WDM device is the Single Mode Fused Wavelength Division Multiplexer/Demultiplexer produced by Gould Electronics. In the case of a multimode fiber system, the wavelengths may be different, e.g., 1300 nm and 850 nm. When a WDM device is used as a demultiplexer, a multiplexed signal, comprising two wavelengths such as 1550 nm and 1300 nm, enters the WDM device on an input optical fiber. The signal is demultiplexed and signals at the different wavelengths leave the WDM device on separate output fibers. Thus in the example discussed herein, a signal at 1550 nm leaves the WDM device on a first output fiber and a signal at 1300 nm leaves the WDM device on a second output fiber.

Currently available optical isolators using fused WDM devices provide about −16 dB of isolation between the two demultiplexed wavelengths. This level of isolation is not satisfactory for all fiber optic applications.

In view of the above, it is an object of the present invention to provide a connector incorporating a wavelength selective filter to increase the wavelength sensitivity of fiber optic components such as WDM devices. It is a further object of the invention to use such connectors to provide increased wavelength isolation for WDM devices.

SUMMARY OF THE INVENTION

In accordance with the present invention, a fiber optic connector is formed by sealing a wavelength selective glass filter (short wavelength pass or long wavelength pass) onto the end face of a ferrule containing an optical fiber end. The resulting connector exhibits an improved coupling ratio versus wavelength characteristic.

Such connectors may be combined with a WDM device to form a structure which provides a high degree of isolation between demultiplexed wavelengths. For example, a connector including a short wavelength pass filter may be coupled to the end of a first output fiber of a WDM device and a connector including a long wavelength pass filter may be coupled to the end of a second output fiber to provide increased isolation. For a system which demultiplexes 1300 nm and 1550 nm radiation, the isolation between the wavelengths may be increased from about −16 dB to between −35 to −50 dB.

DETAILED DESCRIPTION OF THE INVENTION

Figure 1:
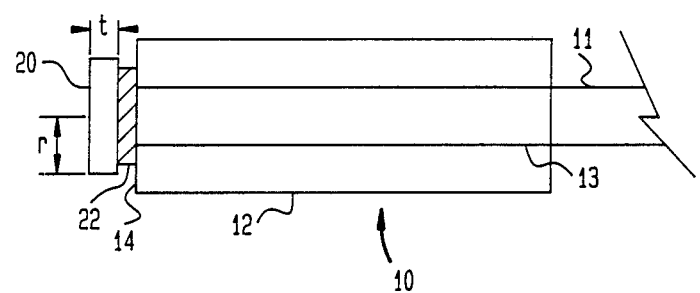
FIG. 1 shows an optical filter sealed to the end of a ferrule to form a connector in accordance with an illustrative embodiment of the present invention.

Turning to FIG. 1, an optical fiber connector 10 exhibiting an improved coupling ratio versus wavelength characteristic is illustrated. As shown in FIG. 1, an end of optical fiber 11 is mounted in a bore 13 of a ferrule 12. Preferably, the ferrule 12 is a ceramic nontapered ferrule having a flat end face 14. An example of this type of ferrule is the 2.5 MM threaded (FC Style) ferrule, from an optical connector, part number 501575, available from AMP Incorporated, Harrisburg, Pa.

The coupling ratio versus wavelength characteristic of a signal entering or leaving the fiber may be improved through use of a wavelength selective filter 20. Illustratively, the filter 20 may be a long wavelength pass filter or a short wavelength pass filter. The filter 20 is sealed to the end face 14 of the ferrule by means of UV cement 22.

Preferably, the size of the filter is quite small to minimize the insertion loss of the optical fiber connector 10 formed by adding the filter to the end-face of 14 of the ferrule 12. Illustratively, the filter 20 has a radius (r) of about 0.03 to 0.04 inches and a thickness (t) which is as small as possible, typically on the order 0.2–3 mils. The filter 20 is typically formed from microsheet glass. Alternatively, the filter 20 may be formed from silica glass which provides a better index match to the fiber which is also made from silica glass.

As indicated above, the isolation provided between wavelengths demultiplexed by a WDM device is substantially increased when connectors of the type illustrated in FIG. 1 are utilized. A WDM device used in association with such connectors is schematically illustrated in FIG. 2.

Figure 2:
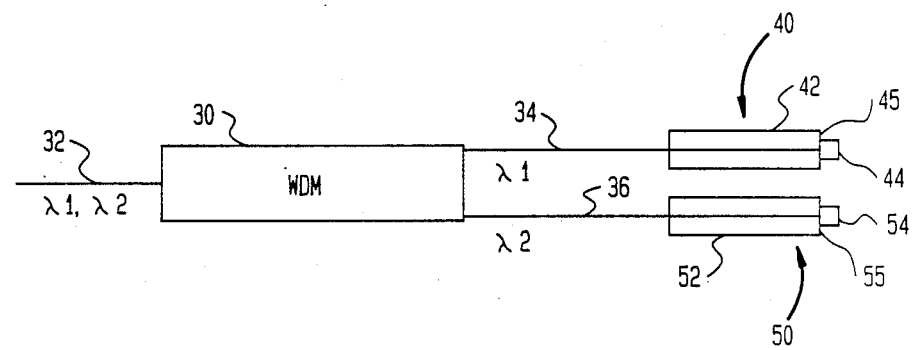
FIG. 2 shows a WDM device that utilizes connectors of the type shown in FIG. 1 to provide increased isolation between wavelengths in accordance with an illustrative embodiment of the invention.

As shown in FIG. 2, a multiplexed signal comprising wavelengths $\lambda 1$ and $\lambda 2$ is transmitted via fiber 32 to the conventional WDM device 30. The WDM device 30 demultiplexes the signal incoming on fiber 32 into its individual wavelength components so that primarily signal at wavelength $\lambda 1$ is transmitted via fiber 34 and signal primarily at wavelength $\lambda 2$ is transmitted via fiber 36.

To improve the isolation between the wavelengths $\lambda 1$ and $\lambda 2$, connectors 40 and 50 are located at the ends of fibers 34 and 36 respectively. The connectors 40 and 50 are of the type shown in FIG. 1. Thus the connector 40 comprises a nontapered ceramic ferrule 42 and a wavelength selective glass filter 44 sealed to an end face 45 of the ferrule 42. The filter 44 transmits a wavelength $\lambda 1$ signal and filters a wavelength $\lambda 2$ signal. Similarly, the connector 50 comprises a nontapered ceramic ferrule 52 and a wavelength selective glass filter 54 sealed to an end face 55 of the ferrule. The filter 54 transmits a wavelength $\lambda 2$ signal and filters a wavelength $\lambda 1$ signal.

Illustratively, the fibers 32, 34, 36 are single mode fibers and λ1 and λ2 are 1300 and 1550 nanometers respectively. In this case the conventional WDM device is a Single Mode Fused Wavelength Division Multiplexer/Demultiplexer available from AMP Incorporated, Harrisburg, Pa. Alternatively, the fibers 32, 34 and 36 are multimode fibers in which case the wavelengths λ1 and λ2 may be 850 and 1300 nanometers respectively.

Finally, the above described embodiments of the invention are intended to be illustrative only. Numerous alternative embodiments may be devised by those skilled in the art without departing from the spirit and scope of the following claims.

We claim:

1. An optical device comprising:

optical means for demultiplexing optical radiation, an input optical fiber capable of transmitting a multiplexed signal comprising first and second wavelengths to said optical means, a first output fiber defining a first longitudinal axis and being capable of transmitting a signal at said first wavelength away from said optical means, said signal at said first wavelength leaving said first output fiber via a first exit facet oriented perpendicular to the first longitudinal axis, a second output fiber defining a second longitudinal axis and being capable of transmitting a signal at said second wavelength away from said optical means, said signal at said second wavelength leaving said second output fiber via a second exit facet oriented perpendicular to the second longitudinal axis, a first connector for terminating said first output fiber, a second connector for terminating said second output fiber, said first connector comprising a first ferrule including a first bore for receiving the first output fiber and a first end face oriented perpendicular to said first longitudinal axis of said first output fiber, said first output fiber being received in the bore of the first ferrule so that the first end face of the first ferrule and the first exit facet of the first output fiber are substantially co-planar, said first connector further including a first sheet of material capable of transmitting radiation in a first bandwidth to which said first wavelength belongs, said first sheet having an area larger than the area of the first exit facet of the first output fiber, and first sealing means for sealing the first sheet to the first end face of the first ferrule, said second connector comprising a second ferrule including a second bore for receiving the second output fiber and a second end face oriented perpendicular to the second longitudinal axis of the second output fiber, said second output fiber being received in the second bore of the second ferrule so that the second end face of the second ferrule and the second exit facet of the second output fiber are substantially co-planar, said second connector further including a second sheet of material capable of transmitting radiation in a second bandwidth to which said second wavelength belongs, said second sheet having an area larger than said second exit facet, and second sealing means for sealing the second sheet to the second end face of the second ferrule, said optical means, said input and first and second output fibers, and said first and second connectors including said first and second wavelength selective sheets together forming a unitary wavelength demultiplexing device having a high degree of wavelength isolation.

2. In combination, an optical fiber for conducting optical radiation, said optical fiber defining a longitudinal axis and an exit facet via which radiation leaves the fiber, said exit facet being oriented perpendicular to said longitudinal axis, and a connector for terminating said optical fiber, said connector comprising a ferrule including a bore for receiving the optical fiber and an end face oriented perpendicular to said longitudinal axis of said fiber, said fiber being received in the bore of said ferrule so that said end face of said ferrule and said exit facet of said fiber are substantially co-planar, said connector further including a sheet of material capable of transmitting optical radiation in a particular wavelength band, said sheet having an area larger than the area of the exit facet of said fiber, and sealing means for sealing said sheet to the end face of said ferrule in an orientation parallel to said end face for filtering radiation exiting said fiber via said exit facet to provide said connector with an improved coupling ratio versus wavelength characteristic.

* * * * *